Dec. 5, 1967
H. W. SEELER
3,356,100
BREATHING CONTROL VALVE AND OPERATOR THEREFOR
Filed Nov. 7, 1962
2 Sheets-Sheet 1
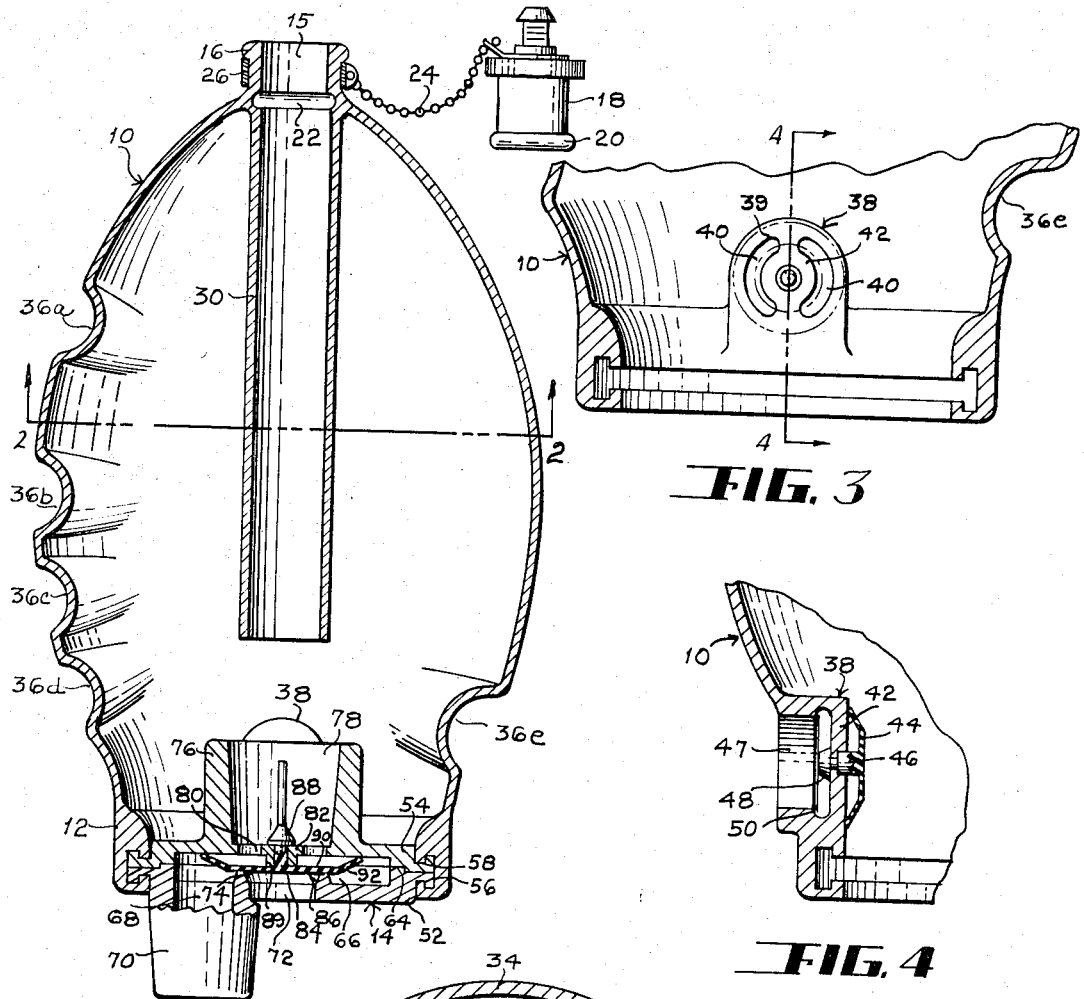
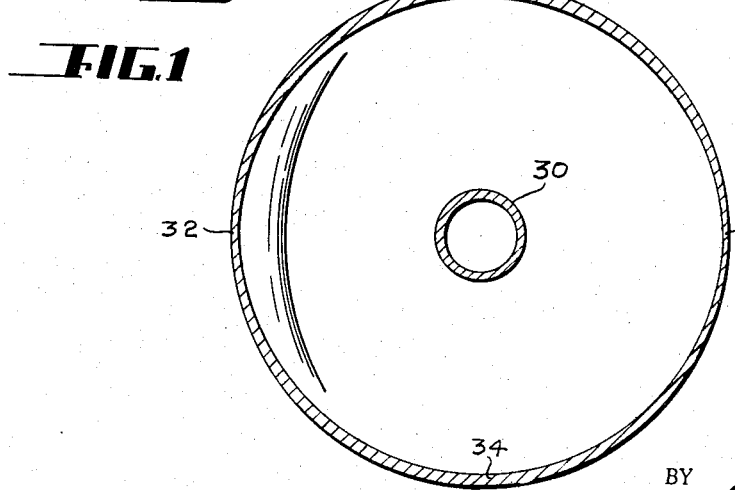
INVENTOR.
HENRY W. SEELER
BY
HIS ATTORNEYS Dec. 5, 1967          H. W. SEELER          3,356,100
BREATHING CONTROL VALVE AND OPERATOR THEREFOR
Filed Nov. 7, 1962          2 Sheets-Sheet 2
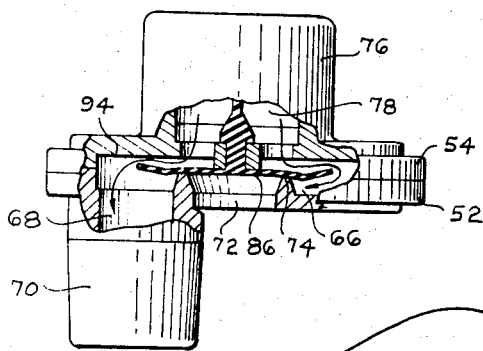
FIG. 5
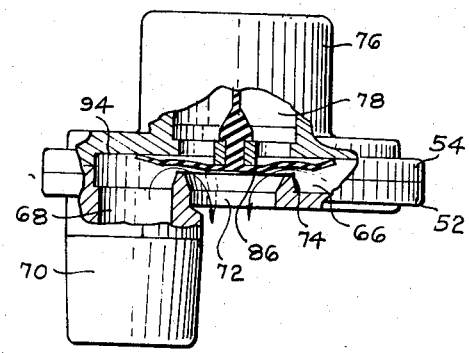
FIG. 6
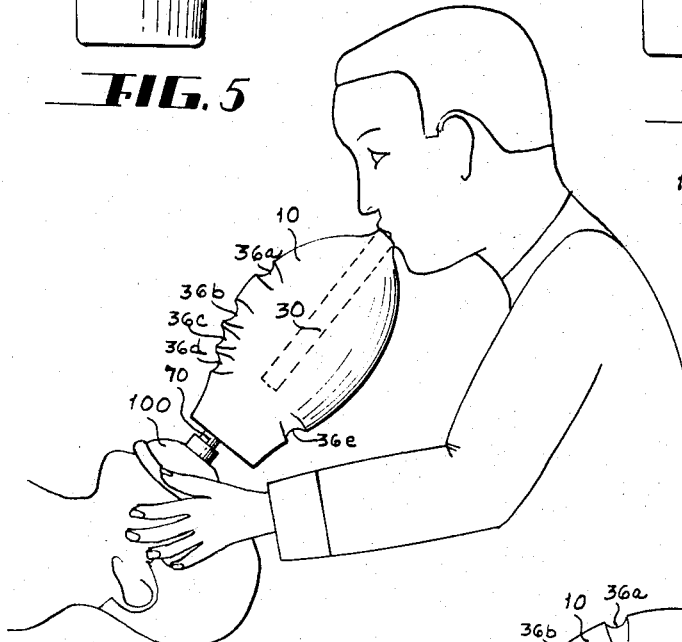
FIG. 7
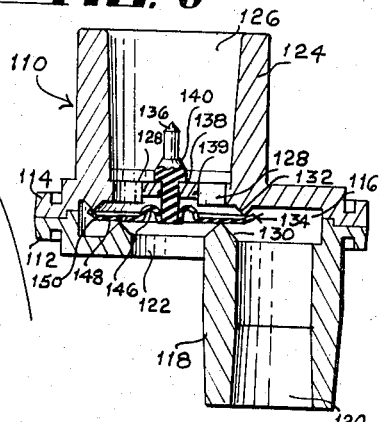
FIG. 9
FIG. 8
FIG. 11
FIG. 10
INVENTOR.
HENRY W. SEELER
BY Dybvig and Dybvig
HIS ATTORNEYS

United States Patent Office 3,356,100
Patented Dec. 5, 1967

3,356,100
BREATHING CONTROL VALVE AND OPERATOR THEREFOR
Henry W. Seeler, 3142 Atherton Road, Dayton, Ohio 45409; Gerda A. Seeler, executrix of said Henry W. Seeler, deceased
Filed Nov. 7, 1962, Ser. No. 236,029
19 Claims. (Cl. 137—102)

This invention relates to a valve assembly adapted for use in breathing assistance devices and to an operator for supplying a fluid under pressure to said valve assembly, the operator being of a type which may be operated either by hand or from the lungs of a person administering breathing assistance or artificial respiration, however, the invention is not necessarily so limited.

An object of the present invention is to provide a new and improved breathing assistor or resuscitator apparatus.

Another object of the present invention is to provide a new and improved fluid distribution valve suitable for use in resuscitator devices.

A further object of the present invention is to provide a new and improved bellows device which can be manually manipulated to pump a fluid and which, with minor adjustment, can be used as an adapter to protect a human operator against hyperventilation in lung powered blowing operations.

A further object of the present invention is to provide a breathing assistor resuscitator device suitable for manual operation and, with minor adjustment, suitable for operation as a mouth-to-mask resuscitator.

Still another object of the present invention is the provision of an improved valve assembly operable as a fluid distribution valve in breathing devices so constructed and arranged that, with the exception of a resilient valve element, no moving parts are required, and all parts may be produced from non-corrosive materials.

Still a further object of this invention is the provision of a new and improved valve element for use in the foregoing valve assembly.

Other objects and advantages reside in the construction of parts, the combination thereof, the method of manufacture and the mode of operation, as will become more apparent from the following description.

In the drawings:
FIGURE 1 is a sectional view of a breathing assistance device constructed in accordance with the present invention.
FIGURE 2 is a sectional view, taken substantially along the line 2—2 of FIGURE 1.
FIGURE 3 is a fragmentary, sectional view illustrating a bellows unit used in the device of FIGURE 1 prior to assembly of a fluid distribution valve therein.
FIGURE 4 is a fragmentary, sectional view, taken substantially along the line 4—4 of FIGURE 3.
FIGURE 5 is an elevational view of the fluid distribution valve with portions broken away to reveal the interior construction thereof, this figure illustrating one condition of operation of the fluid distribution valve.
FIGURE 6 is an elevational view of the fluid distribution valve with portions broken away to illustrate another condition of operation thereof.
FIGURE 7 is a fragmentary, elevational view illustrating one mode of operation of the breathing assistance device of FIGURE 1.
FIGURE 8 is a fragmentary, elevational view illustrating a second mode of operation of the breathing assistance device of FIGURE 1.
FIGURE 9 is a sectional view illustrating a modification of the fluid distribution valve.
FIGURE 10 is a fragmentary elevational view illustrating an adaptation of the fluid distribution valve apart from the bellows unit employed in the breathing assistance device of FIGURE 1.
FIGURE 11 is an enlarged fragmentary, sectional view illustrating a second modification of the fluid distribution valve.

Referring to the drawings in greater detail, the resuscitation device disclosed includes two basic components. One basic component is a dual purpose bellows unit 10 which can be used alternatively to pump air into the lungs of a patient or other chamber, or as an adapter for mouth-to-mask resuscitation or for a similar blowing operation, the bellows unit being so constructed as to avoid hyperventilation in the user thereof. The other basic component is a fluid distribution valve which enables a fluid, such as a breathing gas, to be forced into a patient's lungs or other chamber and also enables the fluid or breathing gas to be expelled from the patient's lungs or other chamber to the ambient atmosphere.

The bellows unit, which is best illustrated in FIGURES 1 through 4, comprises a generally hollow ovate bag or bulb constructed of a resilient material, which may be a rubber or a synthetic plastic material. At the lower end of the bellows unit, as viewed in FIGURE 1, a thickened wall 12 surrounds an enlarged opening to the interior of the bellows unit. As will be more fully described hereinafter, this enlarged opening receives and supports a housing 14 for the fluid distribution valve.

At the upper end of the bellows unit, as viewed in FIGURE 1, a smaller opening 15 is encircled by an annular wall 16. This annular wall is adapted to receive a plug 18 for closing the opening 15. For securing the plug 18 tightly in the opening 15, the lower end of the plug, as viewed in FIGURE 1, has an enlarged annular bead 20 thereon, which may be forced into the opening 15 to seat in an annular groove 22 located on the inner surface of the wall 16. The snugness of this fit is insured by means of a ferrule 26 which surrounds the wall 16. A chain 24, as shown, may be used to attach the plug 18 permanently to the ferrule 26.

For reasons which will become apparent in the subsequent description, an annular wall or tube 30 projecting inwardly of the bellows 10 from the opening 15 is integrally secured with the bag 10, so as to extend the opening 15 downwardly toward the lower end of the bag, as viewed in FIGURE 1.

The bag 10 has been previously characterized as generally ovate. However, for operation of the bellows, it is to be understood that the bellows may have any hollow configuration, the important characteristic being that the resilient material with which the bellows 10 is constructed has a natural shape to which it returns after being distorted, as by compression. In the preferred embodiment, it is desired that the bellows 10 have the shape of a surface of revolution generated about the central axis of the pipe 30, whereby the outer periphery of the bellows in any plane normal to such axis is essentially circular, as shown in FIGURE 2. However, those skilled in the art will recognize that any oval or otherwise rotund shape will suffice for the special purposes described herebelow. Also, in the preferred embodiment, the wall thickness of the bellows 10 tapers from diametrically disposed minima 32 to diametrically disposed maxima 34, as shown in FIGURE 2, the maxima being approximately twice the thickness of the minima. With such construction, the bellows has two diametrically opposed generally crescent shape sides joined at 32 by a web of minimum thickness. In consequence of this construction, when the bellows is squeezed by compressing the thin walled sections at 32 together, the thicker wall crescent shaped sides at 34 accumulate a restoring force which will act quickly to restore the shape of the bellows unit upon release of the compressive force. Finger grooves 36a, 36b, 36c and 36d, together with a thumb groove 36e, formed in the wall of the bellows unit at the thinnest portions thereof, identify the thin wall portions of the bellows unit and assist an attendant in applying a compressive force at the proper points.

Near the lower end of the bellows unit, as viewed in FIGURE 1, a valve support 38 is shown. This support, which is partially obscured in FIGURE 1 by the housing 14, appears in detail in FIGURES 3 and 4. The valve support 38 includes a generally planar wall 39 integral with the bellows 10; but recessed a distance into the interior of the bellows. Located in the wall 39 are a pair of arcuate apertures 40, separated by an intermediate web portion 42. This web portion has a central aperture which receives the stem 46 of an inlet flapper valve 44 adapted to seat upon the interior surface of the wall 39. The flapper valve 44 is anchored by means of a tapered enlargement 48 on the end of the valve stem 46 which, when forced through the aperture in the web 42, expands to firmly lock the valve in place. An opening 47 extends through the exterior wall of the bellows 10 to the apertures 40, so as to permit the passage of air from the surrounding atmosphere into the bellows 10. An annular groove 50, formed in the wall surrounding the opening 47, provides a seat for a filter element (not shown) which may be used to filter air moving into the bellows through the opening 47, when desired, or for an inlet adapter (not shown), similar in external configuration to the plug 18, but having a conduit therethrough.

In operation, the flapper valve 44 lifts off the wall 39 to permit entry of air from the surrounding atmosphere into the bellows whenever the pressure in the atmosphere exceeds that inside the bellows; but seats on the wall 39 so as to prevent the movement of air or gas from inside the bellows to the ambient atmosphere whenever the pressure in the bellows exceeds that of the ambient atmosphere. The wall 39 is located in the thickened wall portion of the bellows 10, so as to minimize distortion of the inlet valve support due to compression and relaxation of the bellows.

As previously mentioned, a fluid distribution valve housing 14 is received in the lower end of the bellows 10, as viewed in FIGURE 1. This valve housing is formed of two separable sections 52 and 54, which have circular peripheries adapted to interfit the annular wall 12 located at the lower end of the bellows 10. Adjacent their peripheries, the housing sections 52 and 54 have annular grooves 56 and 58, respectively, therein. These annular grooves receive annular tongue portions projecting inwardly from the inner surface of the wall 12 and this tongue and groove construction provides a fluid seal surrounding the housing 14. By means of a slight misfit between these tongue and groove portions, a tension is developed in the wall 12, whereby this wall supports the housing sections 52 and 54 in intimate engagement.

Leakage of air along the interface between the housing sections 52 and 54 is retarded by means of a cylindrical boss 64 formed on the face of the housing section 52 which interfits a complementary recess formed in the opposing face of the housing section 54. Such boss and complementary recess also center the housing sections, one with respect to the other.

The central portions of the opposing faces of the housing sections 52 and 54 are recessed away from one another so as to form a fluid receiving cavity 66 therebetween. A fitting 70 formed on the housing section 52 surrounds a first opening 68 leading to the fluid receiving cavity. An aperture 72 formed centrally in the housing section 52 provides a second opening to the fluid receiving cavity. Within the interior of the cavity 66, the aperture 72 is surrounded by an annular valve seat 74, the function of which will be described subsequently.

A fitting 76 formed on the housing section 54 surrounds a third opening 78 leading to the fluid receiving cavity 66.

Communication from the opening 78 through the wall of the housing section 54 is afforded by means of apertures 80 flanking a web portion 82, which may be similar in configuration to the apertures 40 and the web portion 42 employed in the inlet valve previously described. As well understood by those skilled in the art, the apertures 80 may also comprise simple holes formed adjacent the web portion 82, only one hole being essential to the function performed thereby. The web 82 has an aperture therein which receives the stem 84 of a resilient flapper valve 86 located in the interior of the fluid receiving cavity 66. As will appear more fully in the subsequent description, this flapper valve 86 functions to distribute a fluid to various openings in the valve housing 14 and, accordingly, is sometimes designated herein as a fluid distribution valve. The stem 84 includes an enlargement 88, which may be forced through the aperture in the web 82 to a point where it can expand to lock the valve 86 in position. An annular wall 89, surrounding the aperture in the web 82 on the interior side of the housing section 54, supports the valve 86 a predetermined distance from the interior wall of the housing section 54.

For purposes of description, it is helpful to subdivide the one piece valve 86 into two sections, one comprising a circular and planar section 90 and the other comprising a diverging peripheral flange portion 92, which surrounds the planar section 90. In the rest position of the valve 86, as shown in FIGURE 1, a peripheral surface of the flange section 92 lightly engages the interior wall 94 of the housing section 54 in surrounding relation to the apertures 80, the interior surface of the housing section 54 serving as a valve seat. Also, in its rest position, the surface of the planar portion 90 on the opposite side of the valve 86 lightly engages the valve seat 74 surrounding the aperture 72 and the housing section 52. While it has been described that the valve 86 lightly touches the aforementioned valve seats in its rest position, it will be apparent to those skilled in the art, in view of the mode of operation hereinafter described, that the light touching condition described, while desirable, is not essential and that insubstantial gaps between the valve and its respective valve seats in the rest position can be tolerated.

The operation of the breathing assistor or resuscitator device is best understood by reference to FIGURES 5 through 8 of the drawings. FIGURE 8 illustrates utilization of the device as a manually operated breathing assistor or resuscitator. For such operation, the plug 18 is inserted into the opening 15 of the bellows unit 10 and a breathing mask 100 is attached to the fitting 70 provided on the valve housing 14 using a suitably shaped elbow 102. For this purpose, the fitting 70 is provided with a tapered external wall, as shown. The breathing mask 100 can be of a well known conventional construction and for the purposes of the present description, it suffices to note that this breathing mask provides a confined passage from the valve housing 14 directly to the mouth and nose of the patient.

Inhalation by the patient is induced when an attendant manually compresses or squeezes the bellows unit 10, utilizing the conveniently located finger and thumb grooves formed in the exterior wall of the bellows. When the bellows is squeezed, air within the bellows, which would ordinarily be at atmospheric pressure, is compressed, thereby elevating the pressure of such air above that of the ambient atmosphere. This elevated pressure causes the fluid inlet valve 44 to firmly close. In the event a ball check valve is provided in the plug 18, the elevated pressure will also firmly close this ball check valve. At the same time, the elevated pressure will cause the planar section 90 of the valve 86 to seat firmly on the valve seat 74, thereby preventing any escape of gas from within the bellows to the ambient atmosphere.

As the pressure of the gas within the bellows rises, the annular flange portion 92 of the valve 86 is caused to lift off its valve seat against the interior wall of the housing section 54, permitting the gas within the bellows 10 to escape through the opening 68 in the fitting 70 to the breathing mask 100 and from there to the lungs of the patient. The approximate configuration of the flapper valve 86 at this time is illustrated in FIGURE 5.

As the squeezing action on the bellows 10 continues, progressively more air is forced into the patient's lungs, causing the patient's lung pressure to rise above that of the ambient atmosphere. When the squeezing action is discontinued and manual pressure on the bellows 10 released, the thickened wall portions of the bellows apply a force, tending to return the bellows to its initial shape. This action immediately reduces the pressure within the bellows below that of the ambient atmosphere and below that in the patient's lungs, whereupon the annular flange portion 92 of the valve 86 seats firmly against the interior wall of the housing section 54 of the housing 14. This prevents movement of any air from the patient's lungs into the bellows 10. At the same time, the pressure of the ambient atmosphere applied against the inlet valve 44 located in the wall of the bellows 10 causes this valve to open, permitting air to move from the ambient atmosphere into the bellows 10. Such movement of air into the bellows 10 permits the bellows to return to its natural shape.

As the bellows 10 is returning to its natural shape, the gas pressure in the patient's lungs cooperates with the pressure in the ambient atmosphere, both of which exceed the gas pressure within the bellows 10, to lift the planar section 90 of the flapper valve 86 off the valve seat 74 surrounding the aperture 72 in the housing section 52. The configuration of the flapper valve 86 at this time is illustrated in FIGURE 6.

The separation of the flapper valve from the valve seat 74 creates a passage through which air may move from the patient's lungs, through the breathing mask 100 into the gas receiving cavity 66 of the valve housing 14 and ultimately to the ambient atmosphere through the aperture 72 in such valve housing. Since the gas pressure within the bellows 10 will not rise above that of the ambient atmosphere until further pressure is applied to the bellows, a natural exhalation of air from the patient's lungs can continue until such time as the patient's lung pressure has dropped to approximately that of the ambient atmosphere. Specifically, patient exhalation can continue until such time as the patient's lung pressure is insufficient to hold the flapper valve off the valve seat 74. Since, as previously described, the contact between the flapper valve and the valve seat 74 is a light touching contact in the rest position of the flapper valve, the patient's lung pressure at the termination of the natural exhalation described will be only negligibly greater than that of the ambient atmosphere.

From the foregoing description, it will be apparent that repeated manual compression and relaxation of the bellows 10 at properly spaced intervals gauged by the operator, will result in repeated cycles of induced inhalation and natural exhalation of the patient with the flapper valve 86 operating as a fluid distribution valve in automatically assuming the proper position at each phase of the breathing cycle.

FIGURE 7 illustrates utilization of the device of FIGURE 1 for mouth-to-mask resuscitation. For such purposes, a mask 100 covering the mouth and nose of the patient is attached to the fitting 70 on the housing 14 for the fluid distribution valve.

In operation, the plug 18 is removed from the opening 15 in the upper end of the bellows 10. The attendant administering mouth-to-mask resuscitation holds the mask tightly over the patient's mouth and nose while engaging the opening 15 in the bellows unit with his own mouth, as shown in FIGURE 7. The attendant then blows or forcibly exhales into the opening 15 of the bellows 10, causing the gas pressure within the bellows to rise above that of the ambient atmosphere. The elevated pressure firmly seats the inlet valve 44 against its seat on the adjacent wall 39, preventing the escape of air from the interior of the bellows directly to the ambient atmosphere. Similarly, and to the same end, the pressure developed in the bellows 10 causes the fluid distribution valve 86 to seat tightly on the valve seat 74. At the same time, the forced exhalation by the attendant causes the fluid distribution valve to lift off its seat against the interior surface of the housing section 54, permitting air to flow from the bellows through the opening 68 in the valve housing 14 to the face mask and from there to the patient's lungs. This forced movement of air into the patient's lungs causes the patient's lung pressure to rise above that of the ambient atmosphere.

After the attendant has expelled a reasonable amount of air from his own lungs, he commences inhalation without removing his mouth from the opening 15 in the bellows 10. This causes an immediate reduction of the gas pressure within the bellows 10 below that of the ambient atmosphere and this reduction of pressure causes the flange portion 92 of the fluid distribution valve to immediately seat against the interior wall of the housing section 52, thereby preventing any flow of air from the patient's lungs into the bellows unit 10. The reduction of pressure within the bellows unit 10 also causes the fluid inlet valve 44 to open, permitting the attendant to inhale. At the attendant is inhaling, the patient's lung pressure, cooperating with the pressure of the ambient atmosphere, causes the fluid distribution valve to lift off the valve seat 74, permitting the patient to exhale naturally to the ambient atmosphere, as previously described.

During the attendant's inhalation, the first air inhaled comprises his own exhaled air which resides in the interiorly disposed tube 30 within the bellows 10, together with a quantity of his own exhaled air residing in the lower part of the bellows 10 below the end of the tube 30. This air is followed by fresh air from the inlet valve 44 which moves into the patient's lungs and replaces the air and in the tube 30 in the lower part of the bellows 10. As will be described more fully in the succeeding remarks, this inhalation by the attendant of a quantity of his own exhaled air during each breathing cycle prevents the condition known as hyperventilation in the attendant.

When the attendant subsequently forcibly exhales into the bellows, initiating a new inhalation cycle in the patient, the first air forced into the patient's lungs comprises fresh air from the tube 30 within the bellows 10, together with a quantity of fresh air located in the lower portion of the bellows 10 below the tube 30. Thereafter, air from the lungs of the attendant is forced directly into the patient's lungs, the end result being that the patient receives a mixture of fresh air with air exhaled from the attendant's lungs. This type of resuscitation can be continued indefinitely, with the fluid distribution valve automatically assuming the proper position at each portion of the breathing cycle, and with this valve further functioning to prevent any movement of air from the patient's lungs directly into the interior of the bellows 10 or into the lungs of the attendant.

For optimum operation of the subject resuscitator device as a mouth-to-mask resuscitator, it is preferred that the bellows 10 have an interior volume of approximately 1,000 cubic centimeters and that the tube 30, together with the lower portion of the bellows below the lower end of the tube 30 have a volume of approximately 300 cubic centimeters. Thus, during each inhalation cycle of the patient, the patient receives approximately 300 cubic centimeters of fresh air and during each inhalation cycle of the attendant, the attendant receives approximately 300 cubic centimeters of his own previously exhaled air which has high carbon dioxide content. This return of carbon dioxide to the lungs of the attendant avoids dizziness and hyperventilation of the attendant. It is to be understood, of course, that the 1,000 cubic centimeter and 300 cubic centimeter figures are not critical. The 1,000 cubic centimeter volume of the entire bellows produces an overall size which is convenient for manual squeezing and wherein a sufficient amount of air is displaced in each squeezing operation to accomplish a life sustaining respiration in the lungs of the patient. The total volume of the bellows 10 is otherwise unimportant. Of course, the 300 cubic centimeters of retained air capacity created by the interior tube 30 has practical limits. If the retained air capacity substantially matched that of the attendant's inhalation and exhalation capacity, the patient would receive entirely fresh air. However, the attendant would receive only his own exhaled air and this would be obviously undesirable. Similarly, if the retained air capacity becomes too small, insufficient carbon dioxide is returned to the attendant's lungs to prevent hyperventilation.

It is to be recognized that the bellows 10 with its interiorly located tube 30 can serve a useful purpose in other applications than patient resuscitation. Thus, the bellows permits an individual to blow forcefully for prolonged periods of time without encountering hyperventilation. It is, accordingly, useful in the inflation of balloons or inflatable toys or inflatable boats, or the like. For such applications, the fluid distribution valve 86 may be replaced by any simple check valve, or, alternatively, the aperture 72 in the valve housing 14 plugged to enable inflation directly through the fitting 70 without removal of the fluid distribution valve 86. Thus, with reference to the bellows outlet port, the fluid distribution valve functions as a check valve, which permits fluids to leave the bellows, but prevents entry of fluids into the bellows.

In the preceding remarks, the operation of the subject resuscitator device has been described with reference to power supplied by an attendant, either in the form of manual manipulation of the bellows 10 or in the form of a forced exhalation of air from the attendant's lungs. It is to be recognized, however, that other sources of power may be utilized. For example, an adapter, similar to the plug 18 but having a conduit therethrough, may be inserted into the opening 47 leading to the inlet valve 44, and connected directly to a source of breathing gas which can be intermittently released into the bellows 10 to induce forced respiration of a patient.

It is also possible, when a separate source of breathing gas is available, to dispense with the bellows 10 and utilize only the valve housing 14 including the fluid distribution valve 86 for patient resuscitation. Such operation is illustrated schematically in FIGURE 10.

For this operation, the separable parts of the fluid distribution valve housing 14 are secured together by spring clips, such as illustrated at 104. As an alternative, the two sections of the housing 14 can be secured together in a more permanent fashion by gluing or with screws or the like. However, for convenience of cleaning, it is preferred to omit any separate fastening devices when the valve housing is assembled in the bellows 10 and, for special applications as shown in FIGURE 10, it is preferred to employ quickly attachable fastening elements, such as the spring clips illustrated.

In the operation of FIGURE 10, a breathing catheter or airway 106 is secured to the fitting 70 of the valve housing 14, while an adapter 108, suitable for connection to a separate source of breathing gas under pressure (not shown), is utilized for connecting hoses 109 leading from the source of breathing gas to the fitting 76 on the valve housing 14. The breathing catheter 106 is of conventional construction and functions to convey the breathing gas to the throat and lungs of the patient. The source of gas under pressure utilized in this operation may comprise any of a number of breathing devices, such as presently available in many hospital operating and treatment rooms.

The operation of the fluid distribution valve in such application is substantially as previously described, in that a transmission of fluid under pressure to the fitting 76 causes the fluid distribution valve 86 to assume the position illustrated in FIGURE 5, permitting gas to flow to the lungs of the patient and a relaxation of the fluid pressure permits the lung pressure of the patient to move the valve 86 to the position illustrated in FIGURE 6, permitting the patient to exhale to the ambient atmosphere.

FIGURE 9 illustrates a modification of the fluid distribution valve. This modification includes a valve housing 110 formed of separable housing sections 112 and 114, similar in exterior configuration to the housing sections 52 and 54, respectively, of the preferred embodiment. The housing section 112 includes a fitting 118, analogous to the fitting 70 of the preferred embodiment and an aperture 122 analogous to the aperture 72 of the preferred embodiment. The housing section 114 includes a fitting 124, analogous to the fitting 76 of the preferred embodiment.

The housing sections 112 and 114 cooperate to establish a fluid receiving cavity 116 therebetween. The fittings 118 and 124 cooperate to establish openings 120 and 126, respectively, communicating with this fluid receiving cavity. The opening 126 communicates with the fluid receiving cavity through apertures 128 analogous to the apertures 80 in the preferred embodiment.

The interior of the valve housing 110 differs from the preferred embodiment in two main respects. One is the provision of an annular ridge or valve seat 132, encircling the apertures 128 in addition to a valve seat 130 encircling the aperture 122. The other important difference resides in the constructional features of the fluid distribution valve 134 located in the housing 110.

The fluid distribution valve 134 comprises a resilient plate-like element from which projects an attached, centrally located, fastener element 136. The fastener element 136 is a resilient body formed in the shape of a stem having an enlargement 140. The construction is such that the enlargement 140 may be thrust through a central aperture in a web 138 located in the housing section 114 between the apertures 128. When the enlargement 140 is passed entirely through the web 138, it expands to secure the fastener element in place.

The valve 134 is characterized by three prominent features, namely, an annular corrugation 146 surrounding the aperture therein, a peripheral flange 150, and an annular flat section 148 intermediate the corrugation 146 and the peripheral flange 150. In the rest position of the diaphragm, the peripheral flange 150 overlies the valve seat 132 and, being larger in diameter than the valve seat, lightly engages the valve seat along the inside wall thereof. Also, in the rest position of the valve, the flat section 148 on the other side of the valve lightly engages the valve seat 130, with the corrugation 146 lying within the area of contact between the valve seat 130 and the flat section 148.

In operation, the fitting 118 of the valve housing 110 is connected to a suitable adapter, such as a face mask or a breathing tube, for connection to the lungs of a patient. The fitting 124 is connected to a suitable source of breathing gas under pressure. When the fluid pressure in the fitting 118 is approximately that of the ambient atmosphere and the fluid pressure in the fitting 124 exceeds that of the ambient atmosphere, the flat section 148 of the valve is forced into firm engagement with the valve seat 130. At the same time, the gas pressure in the fitting 124 causes the peripheral flange 150 of the valve to lift off the valve seat 132, permitting gas to flow through the fluid receiving cavity 116 to the fitting 118 and to the lungs of a patient. At such time as the fluid pressure in the fitting 124 has relaxed and the patient has commenced to exhale, the lung pressure of the patient causes the peripheral flange 150 of the valve to seat on the valve seat 132, while simultaneously causing the flat section 148 of the valve to lift off the valve seat 130. At this time, the corrugation 146 in the valve 134 performs the beneficial function of permitting the flat section 148 of the valve to lift a substantial distance away from the valve seat 130, providing an exhalation passage which is substantially increased in size by comparison to that available in the preferred embodiment, as illustrated in FIGURE 6.

The enhanced movement of the flat section 148 of the valve afforded by the corrugation 146 can cause the peripheral flange 150 to shift its position on the valve seat 132. Such shift in position is accommodated by the overlapping relationship between the peripheral flange 150 and the valve seat 132. Thus, the peripheral flange 150 is sufficiently large in diameter that it may slide on the valve seat 132 for limited distances without disengaging this valve seat.

A second modification of the fluid distribution valve providing even greater movement of the central portion of the valve plate is illustrated in FIGURE 11. Included in this figure in fragmentary detail are the central portions of housing sections 160 and 162, analogous to the housing sections 52 and 54 of the preferred embodiment and assembled in similar fashion, so as to establish a fluid receiving chamber therebetween.

The housing section 160 is provided with a central aperture 164 analogous to the aperture 72 of the preferred embodiment and is also provided with an opening (not shown), similar to the opening 68 of the preferred embodiment. The aperture 164 is surrounded by an inwardly directed ridge forming a valve seat 166.

The housing section 162 of the second modification is provided with an opening 168, similar to the opening 78 of the preferred embodiment, leading to spaced apertures. Separating the apertures 170 is a web 172 provided with an aperture receiving the stem 174 of a resilient valve plate forming the fluid distribution valve of this second embodiment. The stem 174 is provided with an enlargement 176 which expands to lock the valve in position after being thrust through the aperture in the web 172.

The valve stem 174 supports at its lower end, as viewed in FIGURE 11, a circular and resilient plate portion having an annular flat section 175 overlying and lightly engaging the valve seat 166 in its rest position. Surrounding the flat section 175 is an annular outwardly diverging flange 176 which encircles and partially overlies a circular valve seat 178 formed on the interior wall of the housing section 162 in surrounding relation to the apertures 170 therein. In the rest position of the valve, this flange 176 lightly engages the outer margin of the seat 178.

The fluid distribution valve of this second modification is characterized by a centrally located throat portion 180 communicating to an enlarged thin walled circular chamber 182 underlying the base of the stem 174, as viewed in FIGURE 11. The wall of the chamber 182, cooperating with the wall of the throat portion 180, forms an annular undulating bellows connecting the stem 174 with the flat valve section 175.

In operation, a fluid pressure in the opening 168 exceeding the fluid pressure in the opening 164 and in the fluid receiving chamber between the housing sections 160 and 162 will cause the flat valve section 175 to seat firmly on the valve seat 166, while simultaneously causing the annular flange 176 to lift off the valve seat 178 to establish communication between the opening 168 and the fluid receiving chamber between the housing sections 160 and 162. When the pressure distribution is reversed, such that the fluid pressure within the fluid receiving chamber exceeds that present in the openings 164 and 168, the annular flange 176 is caused to seat firmly against the valve seat 178, while simultaneously the flat section 175 is caused to lift off the valve seat 166. It is in this latter lifting movement that the bellows structure is particularly important. Thus, the bellows provides an exceptionally resilient, easily displaceable spring member lightly supporting the flat section 175 in its rest position and only faintly opposing an upwardly movement of the flat section 175 off its valve seat 166. The collapsible nature of the bellows enables a greatly enhanced displacement of the flat section 175, thereby permitting rapid escape of relatively low pressure gases from the fluid receiving chamber through the opening 164. This feature renders this modified fluid distribution valve particularly suitable for use in the breathing operations previously discussed.

While the device has been described with reference to operations in the ambient atmosphere, it will occur to those skilled in the art, that the subject device can be utilized for pumping or displacing liquids as well as gases and can be operated for such purposes in numerous environments, including under water. A particular benefit derived from the present construction is that each of the component parts of the device illustrated may be fabricated from noncorrosive elements. In particular, the operation of the fluid distribution valve is governed solely by the pressures encountered in the normal breathing cycle and no springs or other biasing elements assisting the positioning of the fluid distribution valve are required. Thus, the need for metallic elements is entirely eliminated and contaminating chemical actions are precluded.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A valve assembly including a housing defining a fluid receiving chamber, said housing having spaced opposed first and second walls facing opposite sides of said chamber, said first and second walls having first and second apertures respectively, each said aperture establishing communication between said fluid receiving chamber and the exterior of said housing, said apertures being approximately aligned on opposite sides of said chamber, said first wall having a ridge surrounding the aperture therein and projecting inwardly of said fluid receiving chamber to form a valve seat, said second wall having a valve seating surface surrounding the aperture therein and facing said fluid receiving chamber, an imperforate pliable valve plate interposed between said first and second walls and between the apertures therein, said valve plate having a rest position in which one side thereof substantially contacts said valve seat and in said rest position having on the opposite side thereof an annular surface portion substantially engaging the valve seating surface of said second wall in surrounding relation to the aperture therein, said annular surface portion surrounding an area of said valve plate which is greater than and includes the area of said valve plate which contacts said valve seat, and valve mounting means comprising one part attached to said housing and another part attached centrally to said valve plate and received in said one part to retain said valve plate between said apertures, said valve plate having an unsupported periphery, said housing having a third aperture spaced from the valve plate therein so as to provide unobstructed communication between said fluid receiving chamber and the exterior of said housing, the construction and arrangement being such that a fluid pressure transmitted to said second aperture exceeding the fluid pressures in said first and third apertures will cause said valve plate to seat firmly on the valve seat surrounding said first aperture while simultaneously causing said valve plate to separate from the valve seating surface surrounding said second aperture thereby establishing communication between said second and third apertures through said fluid receiving chamber and the presence of fluid pressures in said first and third apertures exceeding the fluid pressure in said second aperture will cause said valve plate to separate from said valve seat while simultaneously firmly engaging the valve seating surface surrounding said second aperture thereby closing said second aperture while establishing communication through said fluid receiving chamber between said first and third apertures.

2. The valve assembly according to claim 1, wherein said valve seat is substantially circular and wherein said valve plate comprises a substantially planar and circular base portion having a diameter exceeding that of said valve seat substantially contacting said valve seat on one side thereof in said rest position, and an outwardly diverging peripheral flange portion surrounding said base portion and projecting from the opposite side thereof to engage the valve seating surface of said second wall in said rest position, said another part of said valve mounting means attached to the center of said base portion.

3. A valve assembly including a housing defining a fluid receiving chamber, said housing having spaced opposed first and second walls facing opposite sides of said chamber, said first and second walls having first and second apertures respectively, each aperture establishing communication between said fluid receiving chamber and the exterior of said housing and said apertures being approximately aligned on opposite sides of said chamber, said first wall having a ridge surrounding the aperture therein and projecting inwardly of said fluid receiving chamber to form a valve seat, said second wall having a valve seating surface surrounding the aperture therein and facing the fluid receiving chamber, an imperforate pliable valve plate interposed between said first and second walls and between the apertures therein, said valve plate having a rest position in which one side thereof substantially contacts the valve seat, the separation between said valve seat and the surface of said second wall directly opposite thereto being greater than the thickness of said valve plate whereby a clearance exists for movement of said plate out of contact with said valve seat, said valve plate in said rest position having on the opposite side thereof an annular surface portion substantially engaging the valve seating surface of said second wall in surrounding relation to the aperture therein, said annular surface portion surrounding an area of said valve plate which is greater than and includes the area of said valve plate which contacts said valve seat, and valve mounting means comprising one part attached to said housing and another part attached centrally to said valve plate and received in said one part to retain said valve plate between said apertures, said valve plate having an unsupported periphery, said housing having a third aperture spaced from the valve plate therein so as to provide unobstructed communication between said fluid receiving chamber and the exterior of said housing, the construction and arrangement being such that a fluid pressure transmitted to said second aperture exceeding the fluid pressures in said first and third apertures will cause said valve plate to seat firmly on the valve seat surrounding said first aperture while simultaneously causing said valve plate to separate from the valve seating surface surrounding said second aperture thereby establishing communication between said second and third apertures through said fluid receiving chamber, and the presence of fluid pressures in said first and third apertures exceeding the fluid pressure in said second aperture will cause said valve plate to separate from said valve seat while simultaneously firmly engaging the valve seating surface surrounding said second aperture, thereby closing said second aperture while establishing communication through said fluid receiving chamber between said first and third apertures.

4. The valve assembly according to claim 3, wherein said valve seat is substantially circular and wherein said valve plate comprises a substantially planar and circular base portion having a diameter exceeding that of said valve seat substantially contacting said valve seat on one side thereof in said rest position, and an outwardly diverging peripheral flange portion surrounding said base portion and projecting from the opposite side thereof to engage the valve seating surface of said second wall in said rest position, said another part of said valve mounting means attached to the center of said base portion.

5. The valve assembly according to claim 4, wherein the base portion of said valve plate has a centrally located throat therein communicating with a larger thin walled chamber attached to said another part of said valve mounting means, said throat and said communicating chamber forming a bellows structure which collapses to enhance the separation of said valve plate from said valve seat in the presence of fluid pressures in said first and third apertures exceeding the fluid pressure in said second aperture.

6. The valve assembly according to claim 4, wherein the valve seating surface of said second wall comprises a flat surface encircling said second aperture and disposed substantially parallel to the base portion of said valve plate and wherein the diverging peripheral flange of said valve plate has an annular margin lightly engaging said flat surface in the rest position of said valve plate.

7. The valve assembly according to claim 4, wherein the valve seating surface of said second wall comprises a circular ridge surrounding said second aperture and projecting inwardly of said fluid receiving chamber in substantially concentric relation to said valve seat and wherein the diverging peripheral flange of said valve plate lightly touches said ridge in the rest position of said valve plate.

8. The valve assembly according to claim 7, wherein said mounting means secures a central portion of said valve plate against axial movement between said apertures and the base portion of said valve plate has an annular corrugation therein encircling said central portion and spaced inwardly from said peripheral flange and wherein the diameter to which said peripheral flange diverges exceeds the diameter of the circular ridge surrounding said second aperture, the construction being such that said annular corrugation may flex to enhance the movement of said base portion and said peripheral flange may slide on said ridge through limited distances to accommodate the flexing action of said corrugation without disengaging said ridge.

9. The valve assembly according to claim 8, wherein said annular corrugation is circular and concentric to said valve seat and wherein the diameter of said corrugation is less than the diameter of said valve seat.

10. A breathing valve assembly comprising a housing defining a gas receiving chamber, said housing having a first aperture adapted to connect said chamber to the ambient atmosphere, a second aperture adapted to connect said chamber to a variable pressure source of breathing gas, and a third aperture adapted to connect said chamber to an adapter for transmitting breathing gas to the lungs of a patient, said first and second apertures passing through opposed walls of said housing in approximately aligned positions, the wall through which said second aperture passes having a valve seating surface surrounding said second aperture, the wall through which said first aperture passes supporting a valve seat projecting inwardly therefrom in surrounding relation to said first aperture, an imperforate pliable valve plate and valve mounting means comprising one part attached to said housing and another part attached centrally to said valve plate and received in said one part to retain said valve plate between said apertures supporting said valve plate in said housing between said valve seating surface and said valve seat, said valve plate having an unsupported periphery, said valve plate having a rest position in which one side thereof lightly touches said valve seat and the other side thereof has an annular surface portion engaging said valve seating surface in surrounding relation to said second aperture, the construction and arrangement being such that a gas pressure exceeding that of the ambient atmosphere transmitted from said source to said second aperture will seat said valve firmly on said valve seat while simultaneously separating said valve from said valve seating surface to permit a flow of gas from said source through said gas receiving chamber and through said third aperture to the lungs of a patient, and when the pressure at said source is reduced below that of the ambient atmosphere the ambient atmospheric pressure in said third aperture will cooperate with the patient's exhalation pressure transmitted to said first aperture to seat said valve firmly on said valve seating surface while simultaneously lifting said valve off said valve seat to permit patient exhalation to the ambient atmosphere through said first aperture said gas receiving chamber and said third aperture.

11. The breathing valve according to claim 10, wherein said valve plate comprises a generally circular member having a substantially planar base portion lightly engaging said valve seat on one side thereof in said rest position and having an outwardly diverging peripheral flange projecting from the opposite side of said base to lightly engage said valve seating surface in said rest position.

12. A valve element adapted to operate between valve seats disposed on opposite sides thereof comprising a stem element for mounting said valve element between said valve seats, a substantially flat portion disposed adjacent one end of said stem and adapted to engage said valve seats, a resilient and thin walled structure defining a generally circular chamber interposed between the end of said stem and said flat portion and attached to said stem, said flat portion having a central aperture smaller in diameter than said chamber, and means providing a resilient walled throat attached to the wall of said chamber and engaging one side of said flat portion in surrounding relation to the aperture therein, said throat and the wall of said chamber cooperating to establish a collapsible annular bellows structure between said flat portion and said stem.

13. The valve element according to claim 12, wherein said valve element includes an annular outwardly diverging flange attached to and surrounding said flat portion.

14. The valve element according to claim 13, wherein said flange diverges away from said flat portion on the side thereof engaged by said throat.

15. The valve element according to claim 14, wherein the flange surrounding said flat portion is generally circular.

16. A valve assembly including a housing defining a fluid receiving chamber, said housing having a pair of annular valve seats disposed in confronting relation therein, said valve seats each surrounding a passageway communicating with the exterior of said housing, an imperforate pliable valve plate, valve mounting means comprising one part attached to said housing and another part attached centrally to said valve plate and received in said one part to retain said valve plate between said valve seats, said valve plate having an unsupported periphery, said valve plate having oppositely facing surfaces and having a rest position in which one surface thereof substantially contacts one of said valve seats and the other surface thereof substantially contacts the other of said valve seats, the construction and arrangement being such that a fluid under pressure in either one of said passageways exceeding that in the other passageway will lift said valve plate from the valve seat surrounding said one passageway and press said valve plate against the valve seat surrounding the other passageway.

17. A valve assembly comprising a housing having a fluid receiving chamber therein, a plurality of passages communicating with said chamber, a first of said passages being surrounded by a first valve seat at the end of said first passage communicating with said chamber, a second of said passages being surrounded by a second valve seat at the end of said second passage communicating with said chamber, a third of said passages communicating with said chamber, a single valve element disposed within said chamber between said first and second valve seats, said single valve element having an unsupported periphery, valve mounting means comprising one part attached to said housing and another part attached centrally to said valve element and received in said one part to retain said valve element between said valve seats, said single valve element being movable in response to pressure differential acting thereon from any pressures in said passages to engage said first valve seat in a first position to prevent communication from said first passage to said chamber and to engage said second valve seat in a second position to prevent communication from said second passage to said chamber, said third passage always being in communication with said chamber irrespective of the position of said single valve element, said third passage communicating with said second passage through said chamber when said single valve element is in said first position and said third passage communicating with said first passage through said chamber when said single valve element is in said second position.

18. The valve assembly according to claim 17 in which said single valve element is imperforate.

19. A valve assembly including a housing defining a fluid receiving chamber, said housing having a pair of generally circular valve seats disposed in confronting relation therein, said valve seats each surrounding a passageway communicating with the exterior of said housing, an imperforate pliable valve plate, said valve plate having a substantially planar and circular base portion, said valve plate having an outwardly diverging peripheral flange portion surrounding said base portion and projecting from one side thereof, said valve plate having a rest position in which the other side of said base portion substantially contacts and covers one of said valve seats, said peripheral flange portion substantially contacting the other of said valve seats in said rest position, said base portion having a centrally located throat therein communicating with a larger thin walled chamber, valve mounting means attached to said chamber to support said valve plate within said housing, said throat and said communicating chamber forming a bellows structure which is collapsible upon delivery of fluid under pressure to the passageway surrounded by the one of said valve seats to permit movement of said valve plate away from said one valve seat.

References Cited

UNITED STATES PATENTS

| | | | |
|---|---|---|---|
| 723,042 | 3/1903 | Schwerin | 230—169 |
| 1,412,473 | 4/1922 | Lane | 137—102 |
| 2,428,451 | 9/1947 | Emerson | 128—29 |
| 2,615,463 | 9/1952 | Burns | 128—29 X |
| 2,887,104 | 5/1959 | Sovinsky et al. | 128—29 |
| 2,896,840 | 7/1959 | Hendry | 230—169 |
| 2,902,992 | 10/1959 | Renvall | 128—29 |
| 2,936,779 | 5/1960 | Kindred | 137—525 |
| 2,946,340 | 7/1960 | Hollman | 137—63 |
| 2,946,342 | 7/1960 | Dopplmaier | 137—525 X |
| 2,947,313 | 8/1960 | Taylor | 137—63 |
| 2,954,793 | 10/1960 | Seeler | 137—64 |
| 3,101,732 | 8/1963 | Valle | 137—63 |
| 3,196,890 | 7/1965 | Brandenberg | 137—102 |

FOREIGN PATENTS 875,790  8/1961  Great Britain.

WILLIAM F. O'DEA, *Primary Examiner.*

RICHARD A. GAUDET, *Examiner.*

R. GERARD, C. F. ROSENBAUM, *Assistant Examiners.*